United States Patent [19]

Spray

[11] Patent Number: 5,785,122
[45] Date of Patent: Jul. 28, 1998

[54] WIRE-WRAPPED WELL SCREEN

[76] Inventor: Jeffrey A. Spray, 714 W. Keystone Ave., Woodland, Calif. 95695

[21] Appl. No.: 904,883

[22] Filed: Aug. 1, 1997

[51] Int. Cl.$^6$ .................................................... E21B 43/08
[52] U.S. Cl. .......................................... 166/227; 166/232
[58] Field of Search .................................. 166/227, 228, 166/231, 232

[56] References Cited

U.S. PATENT DOCUMENTS

| 880,635 | 3/1908 | Decker | 166/232 |
|---|---|---|---|
| 1,273,236 | 7/1918 | Layne | 166/232 |
| 1,367,406 | 2/1921 | McLean . | |
| 1,715,856 | 6/1929 | McEvoy, Jr. . | |
| 2,155,744 | 4/1939 | Van Westrum . | |
| 2,346,647 | 4/1944 | Bennison . | |
| 3,789,924 | 2/1974 | Aaltonen et al. . | |
| 4,167,972 | 9/1979 | Sears . | |
| 5,095,990 | 3/1992 | Best et al. | 166/232 X |
| 5,115,864 | 5/1992 | Gaidry et al. . | |
| 5,307,984 | 5/1994 | Nagaoka et al. . | |
| 5,355,948 | 10/1994 | Sparlin et al. . | |
| 5,504,987 | 4/1996 | Bergkvist et al. . | |

OTHER PUBLICATIONS

Driscoll, F.G., et al., "Continous Slot Screen", Groundwater and Wells, Second Edition, 1986, Johnson Filtration Systems Inc., St. Paul, MN, pp. 396–400.

"Wall Thickness", A Guide to Water Well Casing and Screen Selection, Roscoe Moss Company, Los Angeles, CA, 1982, p. 27.

"Stainless Steel Vee–Wire Pipe Size Screens", Johnson Screen General Brochure–ENV–5101, Johnson Filtration Inc., St. Paul, MN, 1993, p. 5.

"Roscoe Moss Continuous Slot Screens", Roscoe Moss Company General Catalog, Roscoe Moss Company, Los Angeles, CA 1985.

Ellis, R.C. et al., Sand Control Handbook, Second Edition, 1983, Gulf Publishing Co., Houston, TX, pp. 1–6, pp. 33–41, pp. 42–50, pp. 51–59, p. 60, Table 12.1.

"The Concept of Sand Control . . . ", Guide to Well Screen Technology, Houston Well Screen Company, Houston TX, 1988, pp. 3–15.

"Nagaoka Ring Base Screen", Nagaoka Company General Brochure, 1988, pp. 2944.

"5 Reasons to Specify Johnson Screens On Your Next Job", Johnson Screen General Brochure, Johnson Filtration Inc., St. Paul, MN, Jun. 1993.

"Continuous Slot Screens", Ground Water Age, Johnson Filtration Inc., St. Paul, MN, Jun. 1991, p. ER-1.

*Primary Examiner*—William P. Neuder
*Attorney, Agent, or Firm*—John P. O'Banion

[57] ABSTRACT

A well screen for placement within wells used to filter out impurities from the fluid entering the well. In the preferred embodiment, the well screen comprises a spirally-wound wire forming a cylinder with gaps between the layers of wire. The layers of wire are attached by spacers placed within the gaps and on the surfaces of the wire such that the spacers do not extend radially beyond the inner and outer edges of the wire, and thus, forming a flush inner and outer well screen surface. The outer edge of the spacer can be slightly recessed from the outer edge of the wire to create greater open area for which fluid can flow through. In the alternate embodiment, the well screen comprises a plurality of rings stacked atop each other and connected together by spacers located at intervals around the circumference of the rings. The spacers are attached to the wire or rings by a secure means such as welding which results in a single unitized screen that is structurally rigid. The spacer/ring configuration allows greater open area on the screen which increases fluid flow and efficiency through the screen.

21 Claims, 6 Drawing Sheets

FIG. — 1

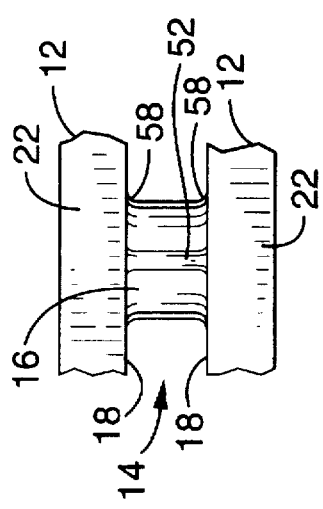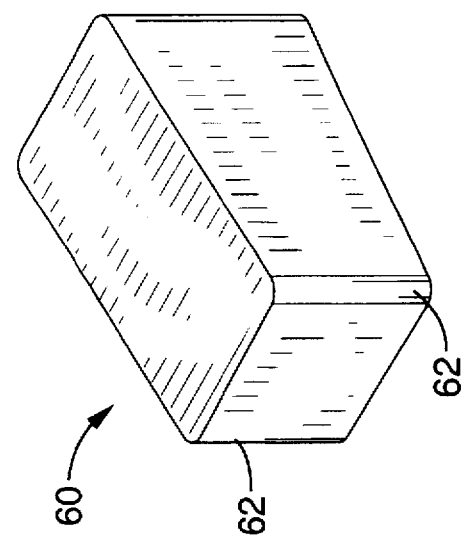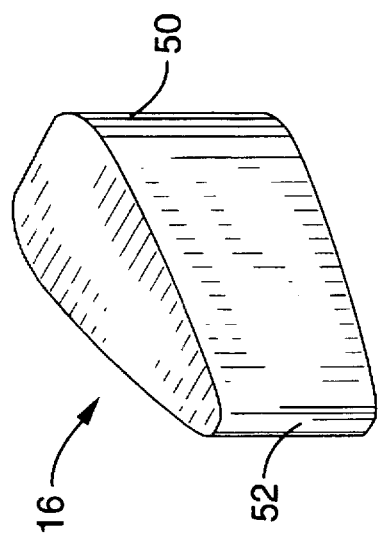

WIRE-WRAPPED WELL SCREEN

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to well screens for oil, gas, mineral, and groundwater production, and groundwater monitoring, and more particularly to an improved one piece wire-wrapped well screen.

2. Description of the Background Art

When water, oil and gas producing wells are drilled through unconsolidated formations, the produced fluids generally contain particulate matter, usually sand. The production of sand, along with the fluids, is an undesired consequence because the sand causes extra wear and abrasion of production tubing, valves, pumps, and other equipment used to produce and remove fluids from the wells. It is therefore beneficial to avoid or minimize the production of sand or other particulate matter during the production of fluids from wells.

One method of accomplishing the reduction of sand or particulate production is by "gravel packing" the well during completion operations. Such gravel packing includes providing on the production conduit or tubular work string a slotted or ported cylindrically shaped member, generally known as well screens, which restricts the passage of particles into the interior of the conduit. For many years, well screens have been used in wells to permit fluid to flow through the screen and into the well while retaining sand and other particulate matter outside the well screen.

A common well screen design uses longitudinal supports tangentially welded to a helical band to produce a frame upon which strainer elements or inserts are attached. The strainer elements or inserts fill the gaps between the longitudinal and helical bars and serve to retain sand and other particulate matter. In such designs, the filtration screen is not self-supporting and is dependent on the frame for rigidity.

Other designs of well screens incorporate "projections" that are formed in a stack of rings and which protrude parallel to the longitudinal axis of the structure and perpendicular to the rings. This enables installers to adjust the gap between the rings during installation of the well screen. However, the projections do not provide structural rigidity to the screen and merely rest on the inner surface of the rings, thereby resulting in an undulated inner well screen surface.

Current screen design practice assumes a 1% ellipticity, which significantly reduces collapse strength and requires use of excess materials in order to achieve the desired resistance. The general tensile calculation for conventional wire wrap screens includes an approximate 30% welding de-rating effect due to welding of the wire or ring apex to the rod tangent, which is also a corrosion enhancer. Wire/rod screens have no torsional qualities. Corrosion, well construction defects, or manufacturing errors occasionally lead to holes or cracks in well casings or screens. One approach toward repair is to spot a serrated piece of slightly undersized casing and hydraulically press this piece over the problem area, essentially forming a patch. This is impractical due to the presence of vertical rod protrusions in conventional wire wrap screens.

Conventional wire wrap screens normally show mostly steel, not open area available for fluid to flow through. The usual range of open area percentage exposed to abutting geological formations is 20%-50% with a fluid entrance efficiency of approximately 90% at best.

BRIEF SUMMARY OF THE INVENTION

By way of example and not of limitation, the present invention is a well screen which generally comprises a wire which is spirally wound to form a cylinder with spaces between each layer of wire. Spacers between the wire at intervals around the circumference of the well screen serve to attach the layers of wire together. The spacers do not extend radially beyond the inner or outer edge of the wire, thus creating a flush inner and outer surface of the well screen. The spacers are permanently and securely attached to the wire by means such as welding which results in a single unitized well screen that is structurally rigid.

In an alternate embodiment of the invention, the well screen comprises a plurality of rings stacked atop one another and connected together by spacers located at intervals around the circumference of the rings, generally forming a cylinder. The spacers do not extend radially beyond either the inner or outer edge of the rings, thus creating a flush inner and outer surface of the screen. The spacers are attached to the rings in the same manner as with the spiral wire well screen design.

This spacer/wire and spacer/ring design allows for fabrication and use of any thickness or width of wire or ring. By increasing wire or ring thickness and essentially melting the vertically oriented rod components of wire wrap screen into the thickness of the rings, and then welding these in place, superior strength is created even with less width profile. Since it is advantageous to provide more open area through which the fluid can enter the screen, aperture dimensions can be varied by adjusting ring thickness, width, spacer dimensions, spacer shapes, and placement, in order to improve fluid flow while simultaneously increasing strength and reducing material requirements.

The spacer shape is also variable which allows the manipulation of fluid dynamics. Improved fluid flow characteristics can be achieved, thus increasing flow efficiency and reducing corrosion and plugging tendencies of conventional well screen designs.

The flush inner surface of the well screen also allows ready installation of "swaged" patches for damage repair and eases repair when fissures develop during use. The flush inner surface allows the use of zone isolation devices with greater effectiveness. The flush inner surface also allows rotation activities within the screen without interference or catching of rods on the rotating device which would otherwise damage or destroy the screen.

This design eliminates or minimizes problems associated with tangential welding and normal stress points as such welds are more robust and less susceptible to corrosion. In addition, any length of well screen can be easily manufactured because no rods are used.

An object of the invention is to provide a one-piece rigid well screen which is self-supporting, has increased structural strength and which can be manufactured efficiently and reliably.

Another object of this invention is to provide a greater area through which fluid can flow, thus enhancing the fluid entrance capability and efficiency.

Yet another object of the invention is to provide for a flush inner and outer surface. The flush inner surface allows the well screen to be cleaned using techniques such as vertical wire brushing and rotary scratching.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 6 is a fragmentary side elevation view of the well screen shown in FIG. 1 showing a spacer between two wires and fillet welds between the spacer and wires.

FIG. 7 is a perspective view of an elliptical spacer in accordance with the present invention.

FIG. 8 is a perspective view of a parallelogram-shaped spacer in accordance with the present invention.

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts without departing from the basic concepts as disclosed herein.

Figure 1:
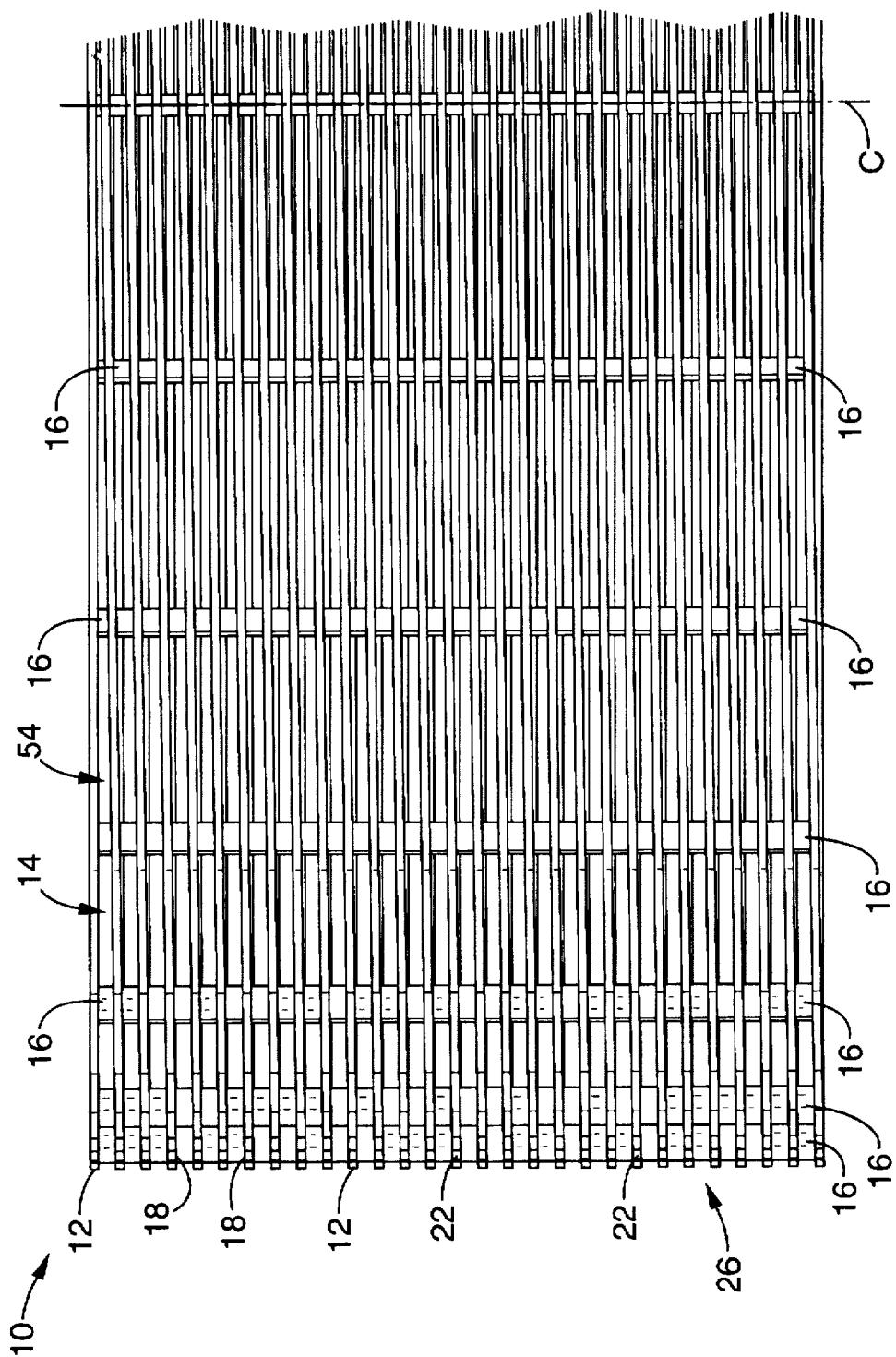
FIG. 1 is a fragmentary side elevational view of a spiral wire well screen in accordance with the present invention.
Figure 2:
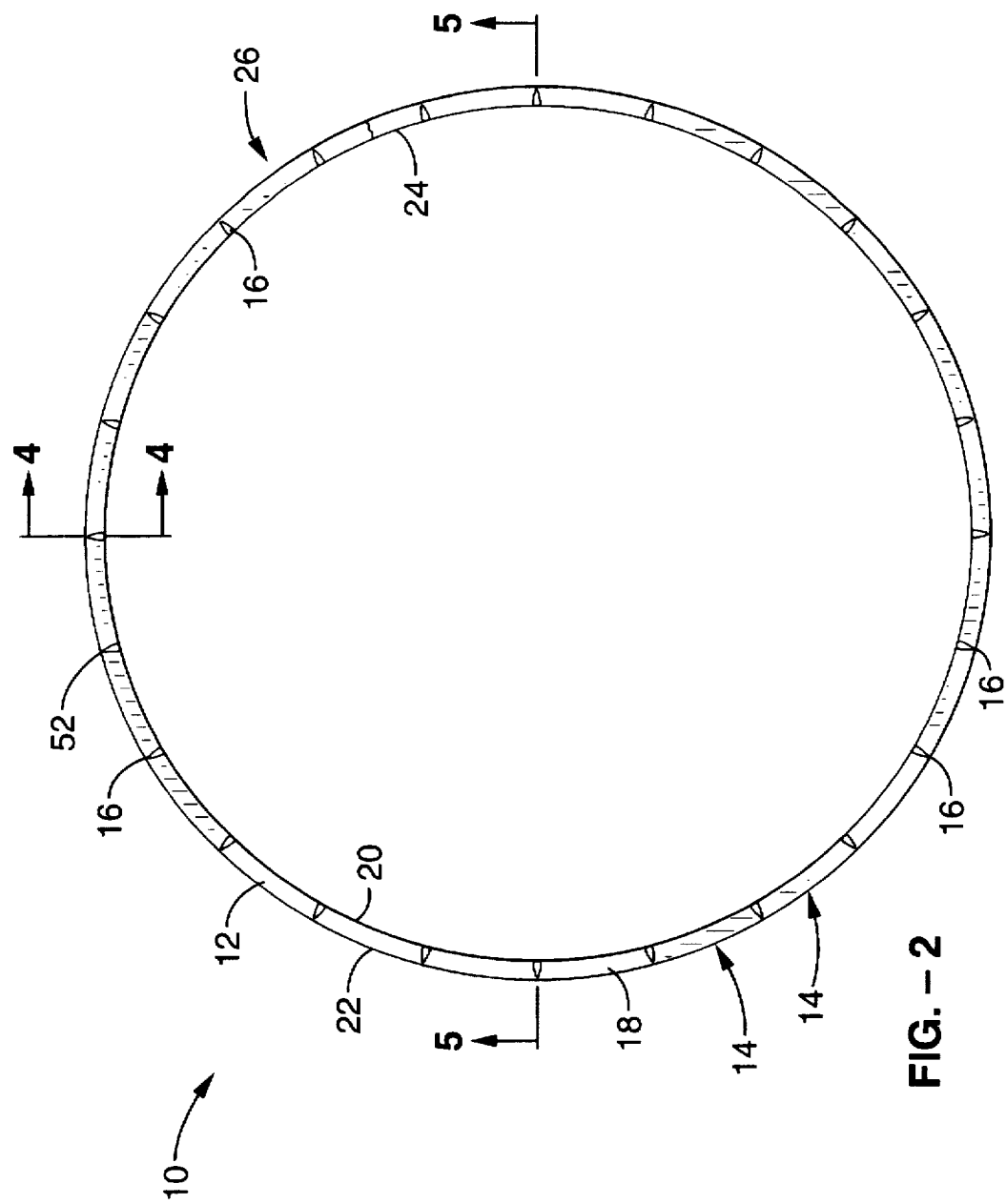
FIG. 2 is a top view of the well screen shown in FIG. 1.

Referring first to FIG. 1 and FIG. 2, it will be seen that a well screen 10 in accordance with the present invention generally comprises a wire 12 spirally wound to form a porous cylinder. Wire 12 is wound with evenly spaced gaps 14 between the surfaces 18 of wire 12, with surfaces 18 of wire 12 attached by spacers 16 between the surfaces 18. Spacers 16 are positioned at intervals around the circumference of the well screen 10 and do not extend radially from the inner edge 20 or outer edge 22 of the wire 12 forming a flush inner surface 24 and outer surface 26 of the well screen 10. The "C" in FIG. 1 represents the central axis of well screen 10.

Figure 3:
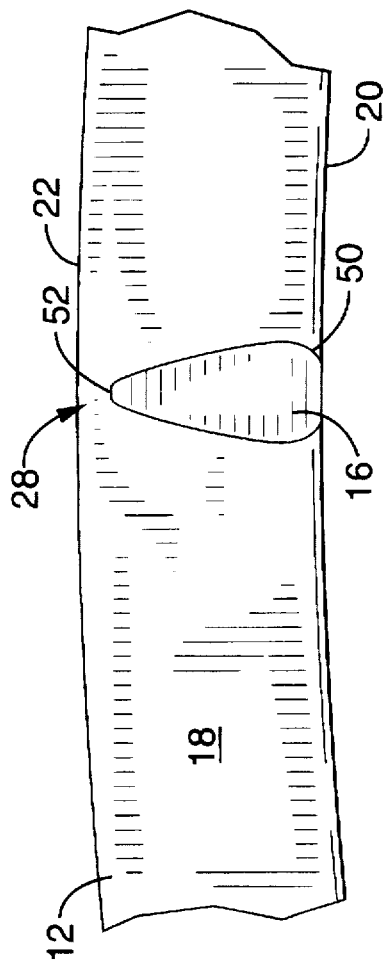
FIG. 3 is top plan view of a ring spacer in accordance with the present invention shown in relation to a fragment of a wire.

Referring also to FIG. 3 and FIG. 7, spacers 16 are designed to minimize disruption of fluid flow along the horizontal axis by using a streamlined or elliptical design 50. The acute 52 or sharper end of spacer 16 is oriented towards outer edge 22 of wire 12, thus minimizing the surface area which restricts fluid flow at or near the entry point. As spacer 16 approaches inner edge 20 of wire 12, the spacer's width and thickness (volume) increases at a slightly slower rate than the greater volume of the widening gap 14 between the surface of wire 12. Thus, a greater net volume of the overall entrance chamber is created, thereby slowing fluid flow and causing less turbulence against entry. Preferably, the outer or acute end 52 of spacer 16 does not extend to outer edge 22 of the wire 12, thus forming a recess 28 from outer surface 26 of well screen 10 This creates a greater open area and continuous opening through which fluid can flow through, thus enhancing fluid flow and efficiency. Recess 28 also aids in controlling corrosion as it reduces the fluid flow rate at that location which consequently reduces the occurrence of corrosion.

Alternatively, the acute end 52 of spacer 16 extends to outer edge 22 of wire 12, giving well screen 10 extra strength and rigidity but reducing the amount of open area. However, the open area given up as a result of spacer 16 extending to outer edge 22 of wire 12 can be made up elsewhere, i.e. wider gaps 14 or fewer spacers 16. The number of spacers 16 between each layer of wire 12 varies according to structural, chemical, hydraulic and economic objectives.

Figure 4:
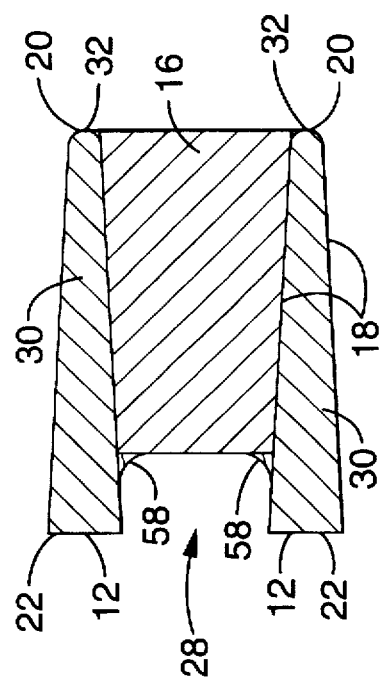
FIG. 4 is a cross-sectional view of the well screen shown in FIG. 2 taken through line 4—4.
Figure 5:
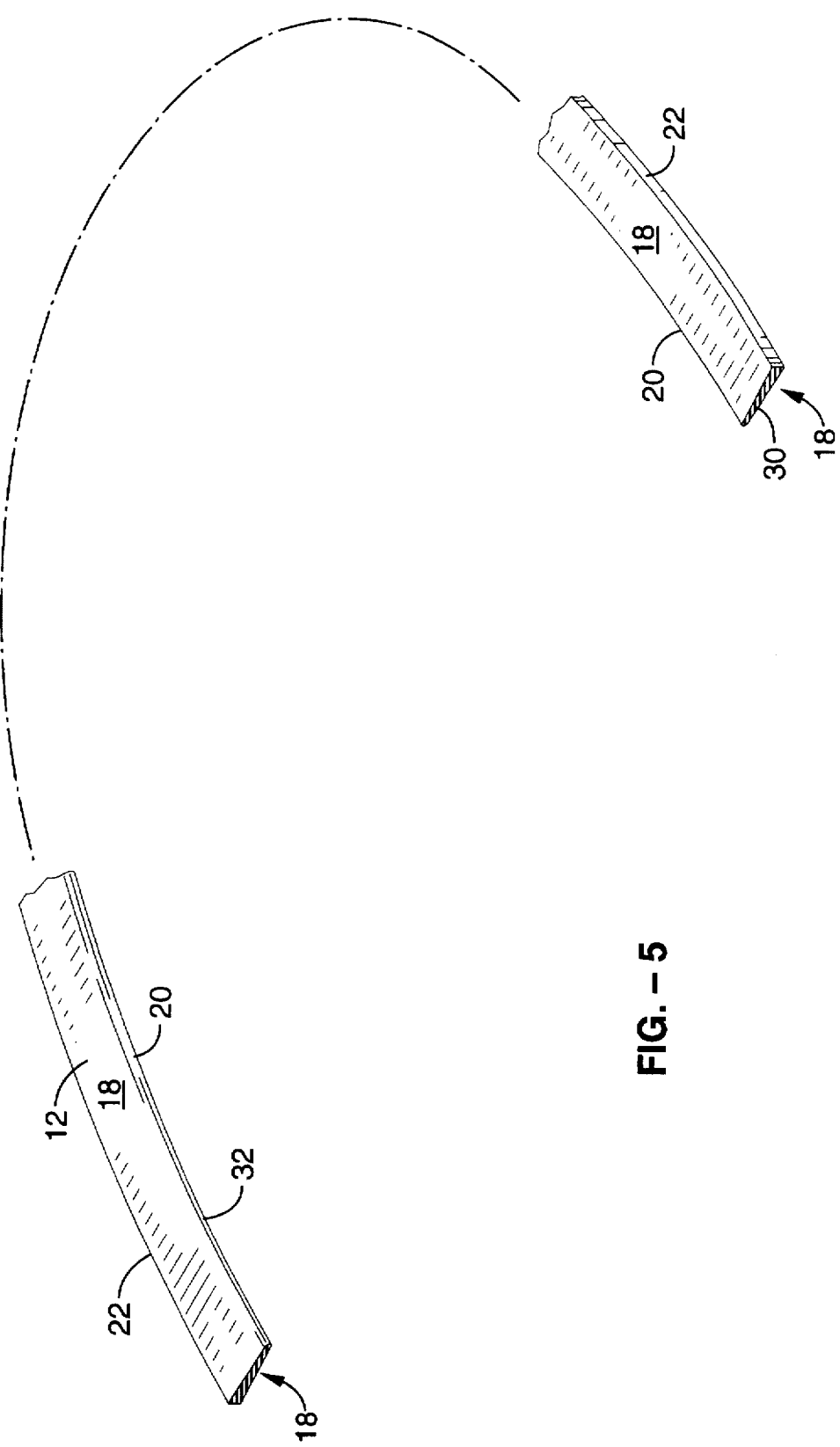
FIG. 5 is a fragmentary cross-sectional view in perspective of the well screen shown in FIG. 2 taken through line 5—5.

Referring also to FIG. 4 and FIG. 5, wire 12 is shown as a cold-rolled formation of a "Vee-shape" or trapezoidal-shape cross section 30 with the apex 32 of the "Vee" or trapezoid oriented towards inner surface 24 of well screen 10. Reducing the width profile (thickness) of the outer edge 22 of wire 12 results in a proportional increase in gap 14, which make up the fluid producing open areas. Because the apex 32 of the wire 12 is oriented towards the inner surface 24 of the well screen 10, the volume of the gap 14 between the layers of wire 12 increases towards the inner surface 24 of the well screen 10. Ideally, the wire width to gap ratio is in the order of 1:2, with the gap 14 width (thickness) generally being twice the wire 12 width profile (thickness). To relieve triangular stress, wire 12 is preferably wound spirally at an angle up to approximately a 6° inclination as measured from the horizontal plane. It is also contemplated that wire 12 can have other cross-sectional shapes.

The width of gap 14 between the surface 18 of wire 12 is variable depending upon the application of the well screen 10. The width is usually based on the relative size of the formation sand to be excluded. Where sands have a broad size distribution, a gap width of two times as large as the ten percentile diameter of the formation sand has been successfully used. Where sands are generally more uniform in size and rounded, a gap width equal to the ten to fifteen percentile formation sand diameter is used.

Identically fabricated spacers 16 are used during manufacturing which results in precisely formed apertures 54, thus allowing for accurate performance calculations and improved sand and particle filtration. Any length of spacer 16 can be used with any thickness of wire 12 and placed at any point along the wire surface 18 in any direction, thus allowing for optimal hydraulic, structural and chemical considerations. The variable circumferential position and spacer 16 shape can be used to benefit the hydraulic behavior of fluids while inside the confines of well screen 10, in the manner the fluids enter from the formation and in the manner which they are injected into the formation. There is a slight circulation loss that occurs as high volumes of water travel through the inner surface 24 from the outer surface 26 of well screen 10, however this circulation loss can be improved by introducing twists or reliefs to the fluid as it enters the screen to emulate natural whirling drainage patterns. Theoretical radial flow patterns into wells are generally not possible due to geological imperfections so, to equalize entry potential, fluid is forced into more exposure to the more perfect area of artificial gravel pack by slightly twisting the fluid flow in a manner commensurate with turbine pumping activity. Also, injection at different rates can be beneficial for cleaning applications by creating diversion and vortices in the fluid flow. Since the spacer system comprises only two separate pieces, spacer 16 and wire 12, cleaner cuts on the inner surface 24 and outer surface 26 can be created, if necessary, during well fishing operations.

The spacer system allows for precise connections between surface 18 of wire 12 by drawing them over a round mandrel or by placing them in a socket and fusion welding them in place. The result is a significantly reduced tubular ellipticity, an important consideration in conventional screen design as most failures occur due to collapse from elliptical induced weaknesses. Fillet welds 58, as shown in FIG. 4 and FIG. 6, around the joints of spacer 16 to wire 12 can further strengthen well screen 10 by reducing triangular stresses. For even greater structural rigidity, spacers 16 can be positioned on the wire surface 18 mid-way above and below an aperture 54, which is formed by the surface boundaries of wire 12 and spacer 16 combination. This basically forms a diamond pattern which reduces leveraged stress across the wire.

The flush inner surface 24 of the well screen 10 allows greater penetration of line scratching (vertical wire brushing) and rotary scratching (rotary brushing). There is a geometric advantage formed during rotary brushing in that at the point of contact with inner rods, bristles are deflected away from the last portion of the sweep through the aperture area. An alternative spacer design in the form of a parallelogram 60 with curved corners 62, as shown in FIG. 8, allows both the initial sweep to be completed and subsequent entry and guiding of the same or new bristles into the next successive aperture, thus achieving a more thorough cleaning. It is also contemplated that spacers 16 could be of other shapes, including straight-edged, curved, and curvilinear shapes.

The invention can be manufactured using a conventional secondary cold rolling process, resulting in greater precision of all aspects of the well screen 10. This process can be followed by a "bead blasting" polishing process, to reduce microscopic irregularities on the wire surface 18 that can contribute to the formation of hydraulic eddies, which are detrimental to smooth and efficient fluid flow. Both processes serve to increase the strength of the well screen 10.

The ability to manipulate spacer 16 placement, shape, position, and quantity allows well screen 10 to flex to fit non-linear wells. There also exists the possibility to couple any length of the well screen assembly with swiveling couplings, thus allowing a high degree of directional change without the need for a manufacturing design change.

Figure 9:
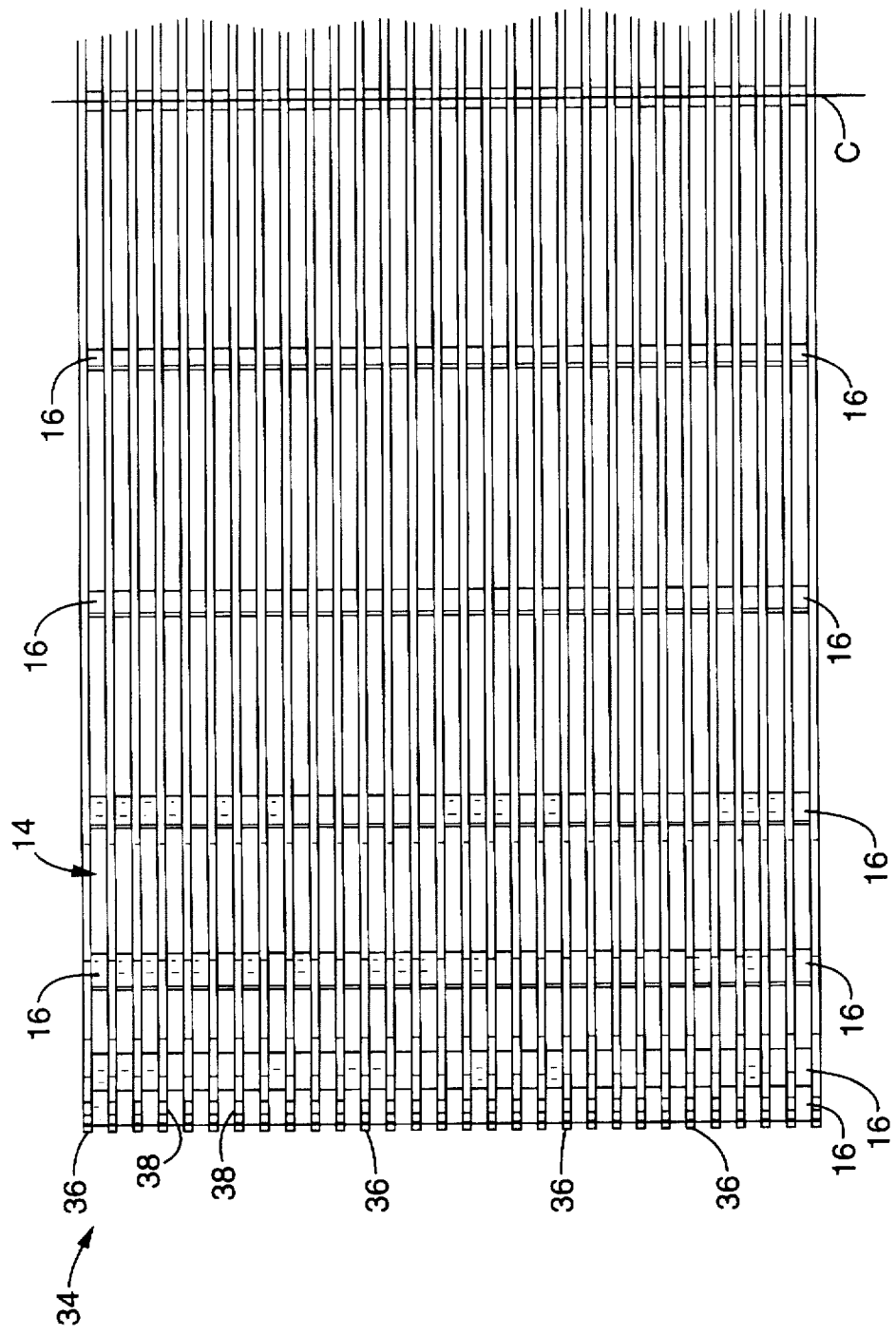
FIG. 9 is a side elevational view of a multiple ring well screen configuration in accordance with the present invention.

FIG. 9 illustrates an alternate embodiment of the invention wherein "C" represents the central axis of the ring well screen 34. Ring well screen 34 comprises a plurality of rings 36 vertically stacked and attached together by spacers 16 placed at intervals circumferentially on the surface 38 of rings 36. Rings 36 are formed by using a cold-rolled formation of a "Vee-shape" or trapezoidal-shape wire 30, as previously shown in FIG. 5, which has undergone an electro-resistance and pressure welding process to form a ring 36. Ring 36 has a generally trapezoidal cross section 30 with the apex 32 oriented towards the inner surface of well screen 34.

All the other aspects of this ring well screen share a similarity to the wire well screen previously discussed.

Those skilled in the art will appreciate that the invention herein can be fabricated from stainless steel, low carbon steel, plastic, polymers, carbon fiber, ceramics and other materials suitable for use in well environments. It will also be appreciated that the invention can be used as a drive point, strainer, filter, or other fluid porous media. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A well screen, comprising:
   (a) a wire wound spirally to form a porous cylinder having a plurality of spaced-apart windings, said cylinder including an outer surface and an inner surface;
   (b) a plurality of spacers positioned in spaces between said windings, said spacers including an inner edge and an outer edge, said inner edge of said spacer positioned flush with said inner surface of said cylinder, said outer edge of said spacer recessed from said outer surface of said cylinder; and
   (c) means for securely attaching said spacers to said windings.

2. A well screen as recited in claim 1, said spacers each having a width and a thickness, said width of each said spacer increasing as said spacer extends toward said inner surface of said cylinder, said thickness of said spacer increasing as said spacer extends toward said inner surface of said cylinder.

3. A well screen as recited in claim 1, wherein each said spacer has an elliptical shape with an acute end and an obtuse end, said acute end of each said spacer oriented towards said outer surface of said cylinder.

4. A well screen as recited in claim 1, wherein said spacers are attached to said windings at intervals around said cylinder so as to form circumferential apertures between said spacers and said windings, and wherein spacers between adjacent windings are positioned mid-way above and below said apertures.

5. A well screen as recited in claim 1, wherein each said spacer is parallelogram-shaped with four curved corners.

6. A well screen as recited in claim 1, wherein said wire has a trapezoidal cross-section having an apex oriented towards said inner surface of said cylinder.

7. A well screen as recited in claim 1, wherein said means for attaching said spacers to said windings comprises fusion welds.

8. A well screen which comprises:
   (a) a wire wound spirally to form a porous cylinder having a plurality of spaced-apart windings, said cylinder including an outer surface and an inner surface; and
   (b) a plurality of spacers welded between said windings, said spacers including an outer edge and an inner edge, said inner edge of said spacer positioned flush with said inner surface of said cylinder, said outer edge of said spacer recessed from said outer surface of said cylinder;
   (c) wherein said spacers are positioned between said windings at intervals around said cylinder so as to form circumferential apertures between said spacers and said windings, and wherein spacers between adjacent windings are attached mid-way above and below said apertures.

9. A well screen as recited in claim 8, said spacers each having a width and a thickness, said width of each said spacer increasing as said spacer extends toward said inner surface of said cylinder, said thickness of said spacer increasing as said spacer extends toward said inner surface of said cylinder.

10. A well screen as recited in claim 8, wherein each said spacer has an elliptical shape with an acute end and an obtuse end, said acute end of each said spacer oriented towards said outer surface of said cylinder.

11. A well screen as recited in claim 8, wherein said spacers are attached to said windings at intervals around said cylinder so as to form circumferential apertures between said spacers and said windings, and wherein spacers between adjacent windings are positioned mid-way above and below said apertures.

12. A well screen as recited in claim 8, wherein each said spacer is parallelogram-shaped with four curved corners.

13. A well screen as recited in claim 8, wherein said wire has a trapezoidal cross-section having an apex oriented towards said inner surface of said cylinder.

14. A well screen as recited in claim 8, wherein said means for attaching said spacers to said windings comprises fusion welds.

15. A well screen, comprising:
 (a) a plurality of concentric spaced-apart rings forming a porous cylinder, said cylinder including an outer surface and an inner surface;
 (b) a plurality of spacers positioned in spaces between said rings, said spacers including an inner edge and an outer edge, said inner edge of said spacer positioned flush with said inner surface of said cylinder, said outer edge of said spacer recessed from said outer surface of said cylinder; and
 (c) means for securely attaching said spacers to said rings.

16. A well screen as recited in claim 15, said spacers each having a width and a thickness, said width of each said spacer increasing as said spacer extends toward said inner surface of said cylinder, said thickness of said spacer increasing as said spacer extends toward said inner surface of said cylinder.

17. A well screen as recited in claim 15, wherein each said spacer has an elliptical shape with an acute end and an obtuse end, said acute end of each said spacer oriented towards said outer surface of said cylinder.

18. A well screen as recited in claim 15, wherein said spacers are attached to said rings at intervals around said cylinder so as to form circumferential apertures between said spacers and said rings, and wherein spacers between adjacent windings are positioned mid-way above and below said apertures.

19. A well screen as recited in claim 15, wherein each said spacer is parallelogram-shaped with four curved corners.

20. A well screen as recited in claim 15, wherein said wire has a trapezoidal cross-section having an apex oriented towards said inner surface of said cylinder.

21. A well screen as recited in claim 15, wherein said means for attaching said spacers to said rings comprises fusion welds.

* * * * *